Patented Oct. 22, 1940

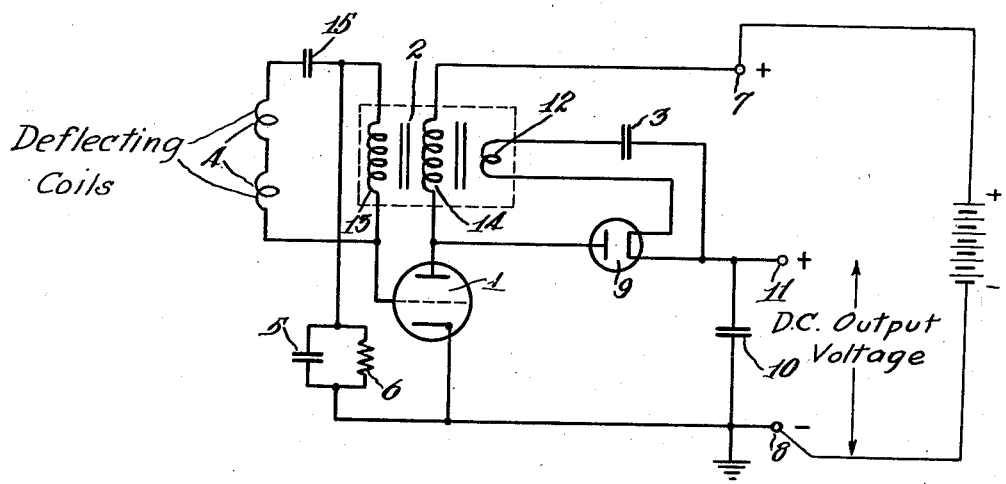

2,218,764

UNITED STATES PATENT OFFICE 2,218,764

SAW-TOOTH WAVE GENERATOR

Rolf Möller and Herbert Bähring, Klein Machnow, near Berlin, Germany, assignors to Fernseh Aktiengesellschaft, Berlin-Zehlendorf, Germany Application February 4, 1939, Serial No. 254,593
In Germany February 4, 1938

3 Claims. (Cl. 250—36)

Our invention relates to a saw-tooth scanning wave generator and particularly to a generator producing a saw-tooth current wave, a portion of which is rectified and utilized for supplying a unidirectional potential. Such a generator is described in the U. S. Patents 2,051,372, issued August 18, 1936, and 2,059,683, issued November 3, 1936, both to P. T. Farnsworth.

The oscillator described in the above-named patents includes a high-vacuum tube, the plate circuit of which is connected to the primary winding of a transformer, while the secondary winding of this transformer is connected to the grid circuit. From such an arrangement a sawtooth current can be derived and caused to flow through deflecting coils which are either directly or inductively coupled to one or both of the transformer windings. During the shorter portion of the saw-tooth wave cycle a short pulse of extremely high voltage is generated. A rectifier tube is connected with the oscillator in such a manner as to permit passage of current during the short pulses. The voltage produced thereby is then filtered and may be utilized to supply a steady high voltage to an electrode of another tube. In television receivers, for instance, this tube may be the cathode ray tube to whose anode the D. C. voltage is applied. In the above-named U. S. Patent 2,051,372 it is shown that the heater supply for the rectifier tube is derived from the power mains. This necessitates the use of a transformer having a filament winding insulated for high voltage because of the high-voltage peaks appearing at the cathode of the rectifier tube.

It is the object of this invention to improve and simplify the apparatus described in the lastnamed U. S. patent by eliminating the filament transformer for the rectifier tube and by deriving the filament power from the saw-tooth wave oscillator.

The invention shall now be described in detail in connection with the drawing showing an embodiment of the invention.

In the drawing there is shown an electron discharge tube 1 and an iron core transformer 2 having the windings 12, 13 and 14. Winding 14 is in the plate circuit of tube 1, while winding 13 is in the grid circuit of the tube 1. The third winding 12 is connected to the filament or cathode of rectifier tube 9 so that the filament power for tube 9 is derived from the oscillator by inductive coupling of winding 12 with windings 13 and 14. Deflecting coils 4 in series with condenser 15 are connected in parallel to with the grid winding 13. Condenser 5 and resistor 6 in the grid circuit of the tube 1 are a time-constant element determining the oscillator frequency, as described in the aforesaid Farnsworth patents. Direct-current plate voltage is applied to the oscillator at terminals 7 and 8 with the polarity indicated in the drawing. The anode of rectifier tube 9 is directly connected to the plate of tube 1, while its cathode is connected through condenser 10 to ground. Condenser 10 serves to filter the rectified voltage, which can be taken off at terminals 11 and 8 with the polarity indicated in the drawing. Preferably a condenser 3 is connected in series with winding 12. It is advisable to dimension the resistance of the filament and the condenser 3 in such a manner that this combination aperiodically damps undesirable self-oscillations of a frequency higher than the sawtooth-wave frequency. It may be seen that in operation rectifier 9 allows current to pass during the high-voltage impulses occurring during the short portion of the saw-tooth current cycle. The rectified voltage is filtered by condenser 10, and terminals 11 and 8 may be connected to the anode and cathode, respectively, of the cathode ray tube, the beam of which is deflected by deflecting coils 4. Filament heating power is derived from the oscillator by means of winding 12. This winding may consist of several turns or only one turn.

In order to avoid unfavorable reaction of the filament circuit of the rectifier tube 9 upon the scanning wave generator, it is preferable to keep the filament power for rectifier tube 9 small compared with the power required to be supplied by the deflecting coils. It has been shown that a filament power of 4% is satisfactory for conventional rectifier tubes, so that unfavorable reaction is readily avoided. It is of advantage to provide saw-tooth waves with extremely short retrace periods in order to produce high-voltage peaks, because the generated voltage is proportional to the rate of change of the current. This can be accomplished by reducing to extremely small values the effective grid inductance and the effective grid capacitance, whereby the effective grid inductance consists of the stray inductance of the grid windings, the mutual inductance of the grid and plate windings and the inductance of the grid output windings, and whereby the effective grid capacitance consists of the inherent capacitance of the grid windings, the grid-cathode capacitance, the screen grid capacitance and particularly the effective grid-plate capacitance.

It may be understood that the filament winding 12 need not be located directly on the transformer, but can also be positioned on a scanning yoke in case such a yoke is substituted for the deflecting coils. While we have shown our invention in connection with the particular circuit shown in the drawing, we do not wish to be limited to this circuit inasmuch as our invention can be applied to all scanning generators producing saw-tooth current waves for electromagnetic deflection of cathode ray beams. The filament power inductively derived from such a circuit or from the deflecting system can also be used to operate other electrodes held at high potentials, such as, for instance, the tube of a scanning generator, a cathode ray tube and like apparatus.

What we claim is:

1. The combination of a generator producing an alternating voltage and including coupled input and output windings, a low-impedance rectifier including a cathode and an anode, said anode being connected to said output winding, and a third winding coupled to and at substantially the same direct-current potential as said output winding, said third winding being connected to energize said cathode.

2. In combination, a source of alternating voltage having output terminals, a first winding connected in circuit between said terminals, a rectifier including a cathode and an anode, said anode being connected to one of said terminals, a second winding coupled to and at substantially the same direct-current potential as said first winding, said second winding being connected to energize said cathode, and a load connected between said cathode and the other of said terminals.

3. Means for producing a saw-tooth voltage and a high direct-current voltage from a source of relatively low direct-current voltage, comprising a vacuum tube having input and output terminals; a first winding in circuit with said input terminals for developing said saw-tooth voltage thereacross; a second winding in circuit with said output terminals and coupled to said first winding; a rectifier having a cathode and an anode, said anode being connected to an output terminal of said tube; a third winding coupled to and at substantially the same direct-current potential as said second winding, said third winding being connected to energize said cathode; and means for deriving said high direct-current voltage from between another of the output terminals of said tube and said cathode.

ROLF MÖLLER.
HERBERT BÄHRING.